UNITED STATES PATENT OFFICE.

NIELS C. CHRISTENSEN, OF SALT LAKE CITY, UTAH.

PROCESS OF TREATING OXIDIZED ORES OF LEAD.

No Drawing.   Application filed December 3, 1920.   Serial No. 428,129.

*To all whom it may concern:*

Be it known that I, NIELS C. CHRISTENSEN, a citizen of the United States, residing at Salt Lake City, in the county of Salt Lake and State of Utah, have invented certain new and useful Improvements in Processes of Treating Oxidized Ores of Lead, of which the following is a specification.

This invention relates to the treatment of ores containing lead carbonate or other oxidized lead minerals, for the recovery of the lead therefrom. As noted in my patent application Ser. No. 327403, a salt solution containing ferrous or ferric chloride will dissolve the lead carbonate, the action of the ferric chloride in the brine being as indicated below:

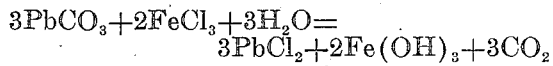
$$3PbCO_3 + 2FeCl_3 + 3H_2O =$$
$$3PbCl_2 + 2Fe(OH)_3 + 3CO_2$$

I have found that the action of the ferric chloride salt solution is much more rapid and complete than the ferrous chloride salt solution, and that the ferric chloride solution is therefore preferable in the treatment of these ores. The object of my invention is to treat these ores with a ferric chloride solution and to recover the lead therefrom in such a way as to secure the ferric chloride necessary in the process. I accomplish this in general in the following manner: The ore is treated (leached or agitated and filtered) with a concentrated salt solution containing ferric chloride in sufficient quantity to react with the lead mineral in the ore and dissolve the lead as a chloride. This pregnant solution is then separated from the residue of ore and the lead recovered therefrom in such a manner that an equivalent of ferric chloride is made for the treatment of more ore. This may be done in general in the two ways as described in the following:

In the first method the ore is lixiviated with a hot salt solution containing ferric chloride using such a proportion of solution to ore as to secure a relatively concentrated lead solution. This hot pregnant solution is separated from the ore and cooled sufficiently to precipitate approximately one-third or more of the lead from the solution as a chloride. This lead chloride is separated from the solution and the remaining lead is precipitated by electrolyzing the solution with an iron anode, the lead being precipitated at the cathode (as a sponge lead) and ferrous chloride being generated at the anode as indicated in the following chemical equations:

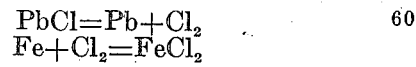
$$PbCl = Pb + Cl_2$$
$$Fe + Cl_2 = FeCl_2$$

The precipitated lead chloride (one third of the total) is electrolized in a molten condition with a graphite electrode giving metallic lead and chlorine as indicated in the following equation:

$$PbCl_2 = Pb + Cl_2$$

The chlorine from this operation is introduced into the ferrous chloride solution formed in the previous operation changing the ferrous chloride to ferric chloride as indicated in the following chemical equation:

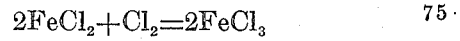
$$2FeCl_2 + Cl_2 = 2FeCl_3$$

thus generating the solution necessary for the treatment of more ore.

In this way the lead may be recovered and the leaching solution regenerated by the use of about one fifth of a pound of iron per pound of lead and the electric power required to electrolize two thirds of the lead in solution (at a voltage which may be as low as one half a volt in warm solutions and with a current efficiency of approximately ninety per cent) and the electric power required to electrolize one third of the lead in a molten condition.

The process may also be carried out as follows: The ore is lixiviated with a concentrated salt solution (preferably warm or hot though a cold solution may be used with good results) containing sufficient ferric chloride to dissolve the lead. This pregnant solution is separated from the residue of ore and two thirds of the lead to be precipitated is removed therefrom by electrolizing the solution with iron anodes forming ferrous chloride and lead as described above. This solution containing the ferrous chloride and the remaining one third of the lead to be precipitated is then electrolized with insoluble anodes (preferably in a cell containing a diaphragm between the anode and cathode) the lead being precipitated at the cathode and ferric chloride formed at the anode as indicated below:

$$PbCl_2 = Pb + Cl_2$$
$$2FeCl_2 + Cl_2 = 2FeCl_3$$

The cell should preferably be arranged so that the solution containing the lead chloride and ferrous chloride flows first through the cathode compartment where the lead is precipitated and then through the anode compartment where the ferrous chloride is changed to ferric chloride by the chlorine released at the anode.

By my process a practically complete extraction of lead from oxidized ores may be secured at a relatively low cost as it will be seen from the foregoing that only one fifth of a pound of iron is required per pound of lead and the cost of electric power required is relatively small due to the low voltage necessary for electrolysis, being approximately one tenth of a cent per pound of lead with power at $50.00 per H. P. year.

Having described my process what I claim and desire to patent is:

1. The process of treating carbonate ores of lead, and the like, for the recovery of the lead therefrom which consists in lixiviating the ore with a warm concentrated salt solution containing ferric chloride and thereby dissolving the lead as lead chloride; separating the pregnant solution containing the lead chloride from the lixiviated ore; cooling said solution and precipitating lead chloride therefrom so as to secure substantially one third of the lead recovered from said ore as precipitated lead chloride; electrolizing the solution with an iron anode and thus precipitating substantially two thirds of the lead recovered from said ore; electrolyzing the above said precipitated lead chloride in a molten condition with an inert anode to separate the lead and chlorine; and mixing said chlorine with above said solution containing ferrous chloride and thus converting said ferrous chloride to ferric chloride; and using the ferric chloride solution thus formed to lixiviate more ore.

2. The process of treating carbonate ores of lead, and the like, for the recovery of the lead therefrom which consists in lixiviating the ore with a hot concentrated salt solution containing ferric chloride and thereby dissolving the lead as lead chloride; separating the pregnant solution containing the lead chloride from the lixiviated ore; cooling said solution and precipitating lead chloride therefrom so as to secure substantially one third of the lead recovered from said ore as precipitated lead chloride; electrolizing the solution with an iron anode and thus precipitating substantially two thirds of the lead recovered from said ore; electrolizing above said precipitated lead chloride in a molten condition with an inert anode to separate the lead and chlorine; and mixing said chlorine with above said solution containing ferrous chloride and thus converting said ferrous chloride to ferric chloride; and using the ferric chloride solution thus formed to lixiviate more ore.

3. The process of treating carbonate ores of lead, and the like, for the recovery of the lead therefrom which consists in lixiviating the ore with a warm concentrated salt solution containing ferric chloride and thereby dissolving the lead as lead chloride; separating the pregnant solution containing the lead chloride from the lixiviated ore; cooling said solution and precipitating lead chloride therefrom so as to secure substantially one third of the lead recovered from said solution as precipitated lead chloride; electrolizing the solution with an iron anode and thus precipitating substantially two thirds of the lead recovered from said solution; electrolizing above said precipitated lead chloride in a molten condition with an inert anode to separate the lead and chlorine; and mixing said chlorine with above said solution containing ferrous chloride and thus converting said ferrous chloride to ferric chloride; and using the ferric chloride solution thus formed to lixiviate more ore.

4. The process of treating carbonate ores of lead, and the like for the recovery of the lead therefrom which consists in lixiviating the ore with a hot concentrated salt solution containing ferric chloride and thereby dissolving the lead as lead chloride; separating the pregnant solution containing the lead chloride from the lixivited ore; cooling said solution and precipitating lead chloride therefrom so as to secure substantially one third of the lead recovered from said solution as precipitated lead chloride; electrolizing the solution with an iron anode and thus precipitating substantially two thirds of the lead recovered from said solution; electrolizing above said precipitated lead chloride in a molten condition with an inert anode to separate the lead and chlorine; and mixing said chlorine with above said solution containing ferrous chloride and thus converting said ferrous chloride to ferric chloride; and using the ferric chloride solution thus formed to lixiviate more ore.

In testimony whereof I have signed my name to this specification.

NIELS C. CHRISTENSEN.